United States Patent [19]

Bieman

[11] Patent Number: 4,647,208

[45] Date of Patent: Mar. 3, 1987

[54] METHOD FOR SPATIAL MEASUREMENT OF HOLES

[75] Inventor: Leonard H. Bieman, Oak Park, Mich.

[73] Assignee: Perceptron, Inc., Farmington Hills, Mich.

[21] Appl. No.: 757,423

[22] Filed: Jul. 22, 1985

[51] Int. Cl.⁴ .............................................. G01B 11/00
[52] U.S. Cl. .................................. 356/375; 356/237; 356/394; 358/101; 358/106
[58] Field of Search ............... 356/375, 378, 394, 237; 250/562, 572; 358/101, 106; 364/559

[56] References Cited

U.S. PATENT DOCUMENTS 3,806,252  4/1974  Harris et al. ..................... 356/237
4,555,798  11/1985  Broadbent, Jr. et al. ........... 356/237

OTHER PUBLICATIONS

Kopydlowski, SPIE, vol. 182, Imaging Applications for Automated Industrial Inspection & Assembly, 1979, pp. 118–129.

Primary Examiner—F. L. Evans
Attorney, Agent, or Firm—Harness, Dickey & Pierce

[57] ABSTRACT

The three-dimensional position of a hole through a workpiece is determined using back lighting or front lighting (feature lighting) to determine the centroid of the hole's image in two-dimensional computer memory image space. The centroid determines a line of sight between the center of the hole's image and the actual center of the hole in real space. Next a crosshair lighting pattern (structured lighting) is projected onto the plane of the workpiece in the neighborhood of the hole. From the reflected crosshair pattern an equation representing the plane containing the hole is determined in image space. The intersection of the plane equation and the line of sight is computed and the three-dimensional, real space position of the hole is determined for comparision with an ideal position established during calibration.

25 Claims, 8 Drawing Figures

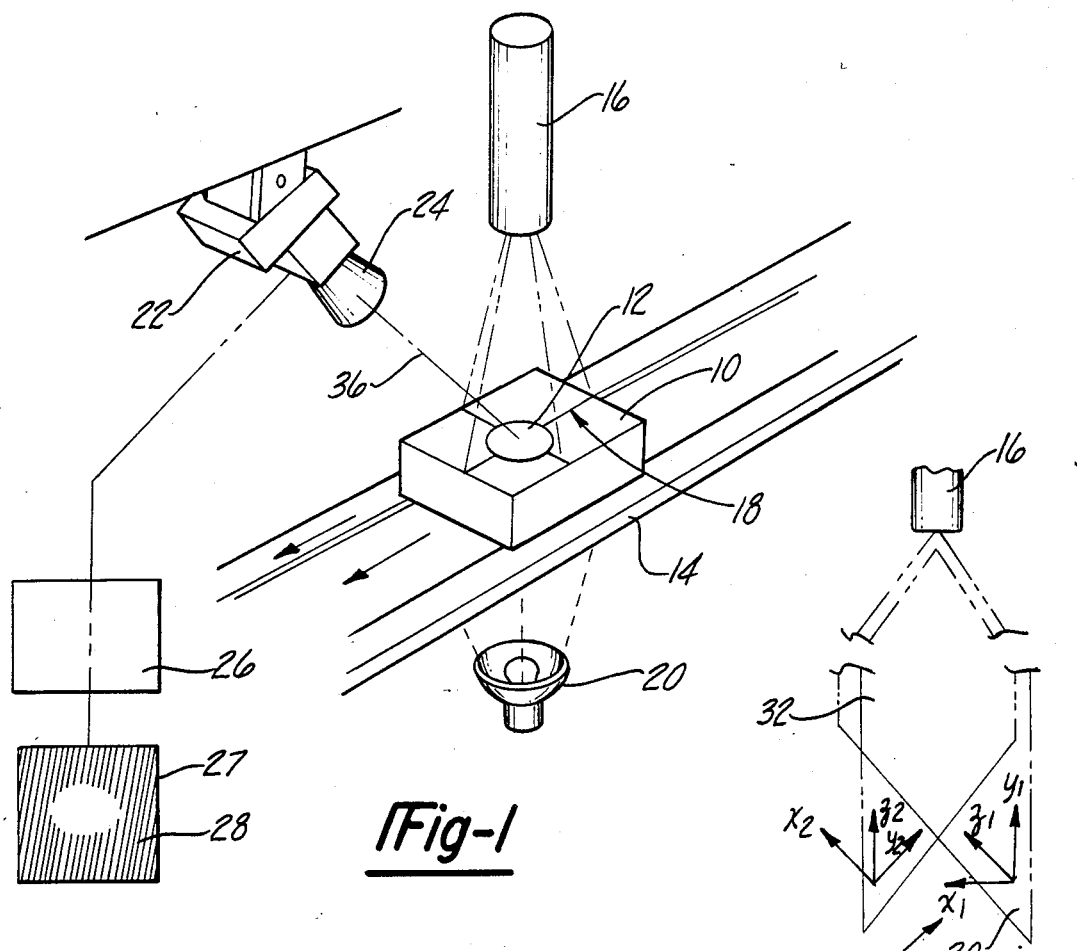
Fig-1
Fig-2
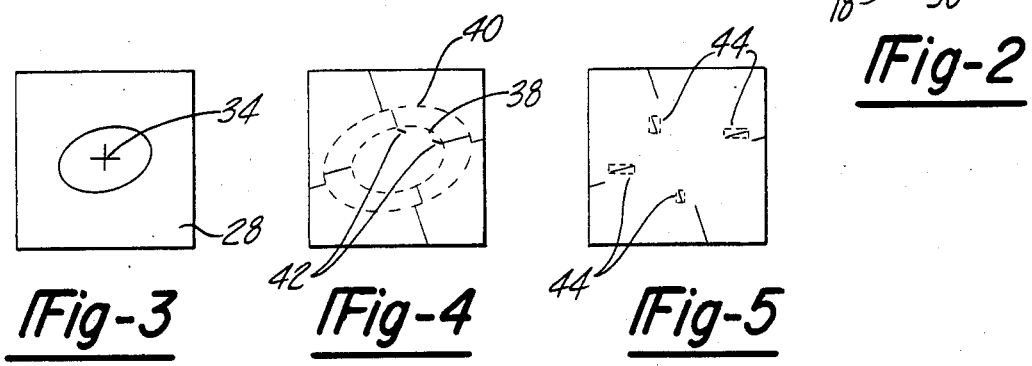
Fig-3  Fig-4  Fig-5
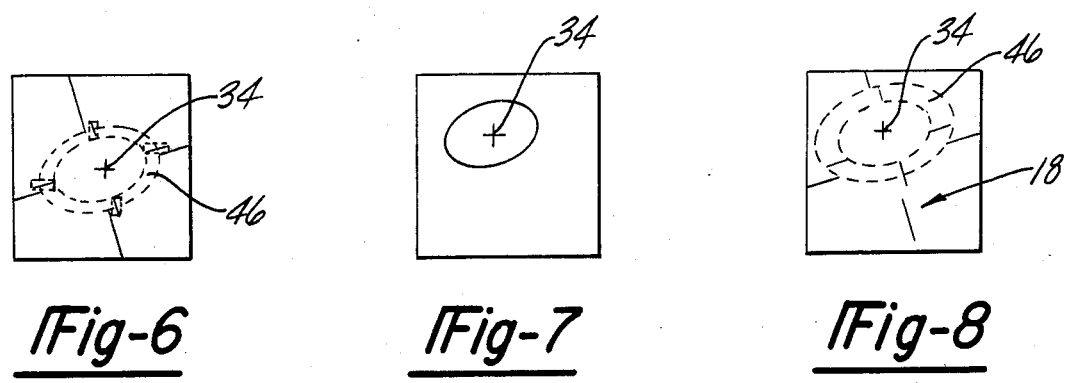
Fig-6  Fig-7  Fig-8

METHOD FOR SPATIAL MEASUREMENT OF HOLES

BACKGROUND AND SUMMARY OF THE INVENTION

The present invention relates generally to optical checking systems and more particularly to an optical method and apparatus for accurately measuring the three-dimensional position, size and shape of a hole in a workpiece.

In manufacturing workpieces, parts and assemblies by processes such as stamping, extrusion, drawing and casting, from materials such as sheet or bulk metal, plastic, film rubber and the like, it is often necessary to make accurate dimensional measurements of the workpiece in order to obtain economies of manufacturing and to produce high quality products. Dimensional measurements may be taken either on-line, as the manufacturing process operates on the workpiece, or off-line, upon samples temporarily removed from the manufacturing production line. In either event, it is necessary that measurements be taken rapidly at many points and in such a manner that the workpiece itself is not touched or otherwise substantially altered by the measurement process.

Inasmuch as a given workpiece may have one or more holes therein, e.g. mounting holes, alignment holes, access apertures, and the like, the accurate measurement of the location, orientation, size and shape of holes is extremely important. A stamped metal hinge part for attaching a door to a motor vehicle is a prime example of a part which requires highly accurate hole positioning, if the door is to fit properly on the finished vehicle.

Presently available optical measuring systems are subject to several shortcomings, particularly where the measurement of holes is concerned. One major difficulty with most optical scanning systems is the inability to precisely determine the perimeter of the hole without a priori information concerning the expected size of the hole. This difficulty results from the fact that known optical scanning systems project a given illumination pattern upon the workpiece and then analyze the manner in which the pattern appears altered upon reflecting from the workpiece. In such systems, the location of a hole appears as a dropout or gap in the predetermined pattern, the boundaries of the dropout or break in the reflected light pattern yielding data from which the position of the hole is determined.

While interesting in theory, it is not easy to determine precisely where the projected light pattern stops and where the drop out begins. Thus, known optical scanning systems have an inherent difficulty with precise hole measurement.

In addition to the above fundamental problem, many known systems are highly specialized and provide limited three-dimensional data, thus limiting their application. Other more sophisticated systems tend to be complex, costly and large in physical size. In addition, these sophisticated systems produce such complex image data that the computer processing time required to assimilate the data is excessive.

It is therefore an object of the present invention to overcome the shortcomings of known optical scanning systems by providing an optical method for accurately locating the three-dimensional position of a hole in a workpiece.

It is also an object of the invention to provide an optical system which may be readily adapted to a wide variety of uses and which minimizes computer processing time to make on-line dimensional testing practical.

It is a further object of the invention to provide a method for measuring the location of a hole in a workpiece with only a minimum of a priori information about the dimensions and orientation of the hole.

It is also an object of the invention to provide an intelligent hole measuring system which is capable of taking surface discontinuities into account without overtaxing the data processing computer.

In general, the present invention comprises a method for measuring the location of a hole in a workpiece using a combination of structured lighting, i.e. light projected in a predetermined pattern, and feature lighting, i.e. substantially uniform back lighting or front lighting. In accordance with the invention, feature lighting is used to illuminate the workpiece, thereby producing an image in image space from which the centroid of the hole may be determined. Structured lighting, preferably including one or more crosshair patterns, is also projected onto the workpiece to produce a reflected image in image space from which the plane containing the hole may be determined. Alternate structured lighting could be used, including a projection of three or more point sources of light or a projection of two or more parallel lines. Using the centroid data in image space there is determined a line in real space which passes through the center of the hole being measured. The exact location of the hole is then determined by determining the intersection of the line which passes through the hole center and the plane containing the hole.

Further, in accordance with the invention, video sensors or the equivalent are positioned in a fixed location and at a known vantage point or viewing angle relative to the structured lighting source and the viewing table or workpiece fixture. The optical data received by the video sensor is encoded as digitial data which is manipulated and stored by the data processing computer. The data received by the sensor comprises a representation of the received light in two-dimensional image space.

According to the invention, image space is related to three-dimensional space by predetermining a transformation between image space and real space, preferably in the form of a rectification table or matrix. The rectification table may be established in which the known pattern of structured lighting is reflected from the viewing table or other surface of known orientation, and the received pattern in image space is recorded and used to generate a plurality of image space data which correspond to each point in real space. The predetermind transformation matrix is then used by the computer in determining the centroid of the hole from feature lighting information and used to determine the plane in which the hole is located from structured lighting information.

Where surface discontinuities, such as bulges in the neighborhood of the hole caused by stamping, might cause inaccuracies, the invention provides for the determination of a data window, based on or relative to the position of the centroid and which excludes the discontinuities. The plane in which the hole lies is then determined using structured lighting falling within the data window. In this fashion, inaccurate results are avoided without excessive time-consuming computation.

These and other objects and advantages of the present invention will become more apparent from a reading of the detailed description of the preferred embodiment and by reference to the accompanying drawings.

BRIEF DESCRIPTION OF THE DRAWINGS

FIG. 1 is a perspective view illustrating an exemplary embodiment of the invention;

FIG. 2 is a sketch illustrating the principles of structured lighting;

FIG. 3 illustrates a video frame taken with feature lighting;

FIG. 4 illustrates a video frame taken with structured lighting cast upon a representative workpiece;

FIG. 5 illustrates a video frame similar to that of FIG. 4 and further illustrating the use of calibration windows during the Teach Mode;

FIG. 6 illustrates the location of the safe region used to calculate the plane of a hole during the Run Mode;

FIG. 7 illustrates a video frame taken using feature lighting projected through the hole of a workpiece during the Run Mode; and FIG. 8 illustrates a video frame taken with structured lighting cast on the workpiece from which FIG. 7 was generated and used during the Run Mode to locate the plane of the workpiece surface through which the hole passes.

DESCRIPTION OF THE PREFERRED EMBODIMENTS

Referring to FIG. 1, the present invention is implemented using a combination of structured lighting and feature lighting to determine the precise location of a hole within a workpiece. Accordingly, FIG. 1 illustrates an exemplary workpiece 10 having a hole 12 therein. Workpiece 10 is illustrated as supported upon a conveyor system 14. The invention finds utility in automated or semi-automated production lines wherein workpieces are moved from one work station to the next using an automatic conveyor system. For purposes of illustrating the invention, conveyor system 14 is depicted generally as a moving belt or course. It will be understood that any type of conveyor system may be used to practice the invention. The invention may also be practiced in non-automated systems wherein the workpiece is placed at the hole measurement station by the human operator.

Structured lighting is provided using a light source 16 which projects a cross-hair pattern 18 upon the workpiece. Preferrably light source 16 is a helium neon laser having beam spreading and cross-hair forming optics positioned in the laser beam path to provide the cross-hair pattern. For a further explanation of a suitable structured light producing source, reference may be had to commonly assigned U.S. patent application Ser. No. 528,726 filed by Dewar et al and entitled "Three Dimensional Measurement Of Objects And Assemblies Of Objects", which is hereby incorporated by reference.

The invention further employs a feature lighting source 20, which may be positioned to provide either front lighting or back lighting of the workpiece 10. Back lighting is illustrated in FIG. 1. Feature lighting source 20 may be implemented using a quartz halogen lamp with integral parabolic reflector, generally similar to projector lamps used in slide projectors. Of course, other types of light sources may also be utilized to provide feature lighting.

The invention further comprises an optical sensor 22, preferrably in the form of a video camera device having focusing lens 24. Although a variety of different types of optical sensors may be used, the presently preferred embodiment uses a solid state array-type video sensor which has proven to provide more repeatable results without the drift associated with vacuum tube video sensors. Sensor 22 is electronically coupled to an image processing computer 26. Computer 26 may be implemented using a general purpose minicomputer or microcomputer to implement the algorithms yet to be discussed. In FIG. 1, computer 26 includes a graphic memory space, visual image memory space, or image space 28. For purposes of illustrating the invention, image space 28 is depicted as containing the graphic image of hole 12, as it might appear to the sensor 22 with feature lighting source 20 providing back lit illumination. The graphic representation of image space 28 is for the human operator's benefit, since computer 26 would store the image space information in an array or some other comparable data structure within the computer's random access memory. A visual representation of the image space data, such as that depicted in FIG. 1, may be displayed upon a video display terminal 27 coupled to computer 26. As will be discussed below, computer 26 is also preferrably provided with a light pen (not shown) or an equivalent data input device through which the human operator can interact with the computer during the Teach Mode.

FIG. 2 depicts the presently preferred structured lighting in greater detail. The preferred structured lighting comprises first and second light planes 30 and 32 which intersect at right angles. When the light planes are orthogonally projected onto a plane surface, such as the top surface of workpiece 10 of FIG. 1, a cruciform or cross-hair pattern 18 is projected. With reference to FIG. 2, it will be seen that light planes 30 and 32 each define a given plane in real space. For convenience, both planes are illustrated in conjunction with a three dimensional cartesian coordinate system. Light plane 30 is associated with coordinate system $X_1$, $Y_1$ and $Z_1$; light plane 32 is is associated with coordinate system $X_2$, $Y_2$ and $Z_2$. The two coordinate systems illustrated are merely for purposes of describing the invention. There are, of course, numerous other ways to describe the intersecting light planes in real space. The present coordinate system is selected such that for a given light plane the X coordinate value is always zero, i.e., the light plane defines the X coordinate. Thus, for a given light plane, a point located at a given (Y,Z) coordinate has a known three dimensional real space position (X,Y,Z).

With reference to FIG. 1, it will be seen that light source 16 is at a fixed location relative to optical sensor 22 and relative to the conveyor system upon which workpiece 10 is disposed. Thus, the intersecting light planes emanating from light source 16 define a pair of fixed coordinates with respect to which the location of illuminated points may be determined. Any point falling on one of the two lines which make up cross-hair pattern 18 can be assigned on image space coordinate position (a two dimensional ordered pair) and the three dimensional real space position (a three dimensional ordered triplet) can be inferred from the image space location, since the third dimension, the light plane, is known.

In order to convert a two dimensional image space coordinate into a three dimensional real space coordinate a pair of look-up tables or rectification tables are used, one rectification table for light plane 30 and another rectification table for light plane 32. Once the rectification tables are established for a given set of calibration conditions, then any point or succession of points (a line) in two dimensional image space can be readily converted by look-up procedures into a three dimensional position in real space. Using currently available solid state video array technology, the present invention works at a resolution of approximately 10 to 20 microns, with a typical view area being approximately 25 millimeters by 30 millimeters. Of course, the resolution and view area size is dependent upon the desired accuracy of the system, the size of the hole to be measured, and so forth. Thus the foregoing values should be considered as exemplary of the presently preferred embodiment and not as a limitation upon the scope of the invention as claimed.

In the presently preferred embodiment the three dimensional position of a line reflected from the surface of the workpiece is computed from the succession of image space points which make up the line, using a least squares curve fitting algorithm known in the art. In order to determine which rectification table to use in making the conversion, the slope of the line in image space is determined. A line with positive slope uses one rectification table while a line with negative slope uses the other rectification table. At the cross-hair intersection point and in the surrounding neighborhood, it is usually advisable to mask-out or ignore the data, since it can frequently be difficult to determine on which crosshair, and hence which rectification table, a particular datum point resides. This is usually not a problem since the cross-hair intersection can normally be caused to occur in the space covered by the hole to be measured.

Referring now to FIGS. 3 through 8, the presently preferred method will be described in detail. For purposes of explaining the method it will be assumed that workpiece 10 of FIG. 1 is positioned generally as shown, so that the structured light from light source 16 casts a cross-hair pattern 18 upon the surface of the workpiece, and so that feature lighting source 20 shines upwardly through hole 12 but is otherwise blocked by the workpiece. It will further be assumed that optical sensor 22 is fixedly secured and trained upon hole 12 and cross-hair pattern 18 as shown. It is presently preferred to position light source 16 directly above workpiece 10, with optical sensor 22 positioned offset to the side. Other arrangements are also usable, however.

TEACH MODE

In order to calibrate the system prior to use on-line, the following Teach Mode procedure is followed. A workpiece known to have the correct dimension is selected as the standard against which all other workpieces will be compared. The workpiece is positioned beneath light source 16 and above light source 20, as shown in FIG. 1. The workpiece is then illuminated using feature lighting from source 20 which provides back lighting to illuminate the hole 12. Although back lighting is illustrated in the present example, it will be understood that front lighting may be used instead, in which case lighting source 20 would be positioned generally above workpiece 10. The primary difference between back lighting and front lighting is that with back lighting the hole appears as a bright spot in image space, whereas with front lighting the hole appears as a black spot in image space. FIG. 3 illustrates image space with feature lighting turned on. Due to the angle at which optical sensor 22 is positioned, the image of hole 12 appears elliptical. The data representing the collection of points making up the elliptical image is then fed to computer 26 where the centroid 34 is calculating using well known numerical methods. Centroid 34 in image space 28 actually represents the line of sight between the center of hole 12 in real space and the point on lense 24 which corresponds to centroid 34 in image space. FIG. 1 illustrates line of sight 36.

Next, the feature lighting is turned off and the structured lighting is turned on to project a cross-hair pattern on the workpiece. The projected cross-hair pattern appears generally as illustrated in bold lines in FIG. 4. FIG. 4 also illustrates dashed line 38 in the form of an ellipse. Dashed line 38 represents the boundary or edge of hole 12. Dashed line 38 would not be visible in image space, but is shown in FIG. 4 as an aid to the reader. FIG. 4 also includes a second dashed line 40 which, like line 38, is not visible in the image but is included to show the outermost boundary of the plane in which hole 12 lies. The structured light falling outside dashed line 40 falls on a plane generally lower than the surface containing hole 12. Note also that the image of FIG. 4 includes short line segments at 42 which represent light striking the inner side walls of the hole. Only two such line segments are visible, since optical sensor 22 is positioned at an angle such that the other two segments are obscured.

Referring to FIG. 5, the human operator next specifies four windows 44, shown as dashed rectangles, by using a light pen or other screen oriented data input device (cursor movement keys, joystick, mouse, etc.). In the presently preferred embodiment the operator points with the light pen to the upper right and the lower left corners of the light segments falling within the region known to be in the same plane as the hole. The computer then inscribes the windows as shown in FIG. 5. Since calibration need normally occur only once prior to on-line testing, it is presently considered cost effective to have the human operator identify the four windows from which valid data may be taken. With a little prior training most persons can readily identify the proper segments about which to create the windows. Of course other techniques for locating the windows automatically may be effected instead.

Once the four windows have been established, the line segments within those windows are then used to calculate the mathematical equation which represents the plane in which hole 12 and all four line segments lie. By determining the slope of each line segment and using the proper rectification table, a three dimensional real space representation of the plane is arrived at. Once the orientation of the plane is known, an annular region 46 is determined. Annular region 46 is generally elliptical in FIG. 6, corresponding to the elliptical shape of the image of hole 12. Annular region 46 is determined in relation to centroid 34, so that no matter where the centroid of a given hole lies, the corresponding annular region can be located. Stated differently, if centroid 34 were to be relocated three units up and four units to the right, then each point in the annular region would also be translated three units up and four units to the right. Preferably, annular region 46 is actually drawn on the computer display screen, so that the operator can make sure that the correct region is specified while still in the Teach Mode. During the Run Mode, yet to be described, it is the annular region 46 from which all valid data is derived. In this way, the algorithm insures that false data from other plane surfaces does not enter into the hole measurement.

RUN MODE

Having calibrated the system during the Teach Mode, the invention may be used to check the positions of holes on a successive plurality of unknown workpieces. To illustrate, assume that a workpiece 10 having hole 12 is positioned generally as shown in FIG. 1. Since the workpiece, so positioned, may not be identical to the standard workpiece used during calibration, the data developed measurement may differ from the data developed during calibration. According to the presently preferred method, the feature lighting source 20 is turned on to illuminate the workpiece and hole in the same way as the standard workpiece was illuminated during calibration. FIG. 7 depicts an exemplary image produced. Note by comparing FIGS. 7 and 3 that the centroid 34 of FIG. 7 may occur at a different position in image space (and in real space) than did the centroid of FIG. 3. The centroid 34, nevertheless, represents the line of sight between the center of the hole being measured and the centroid point in image space. The centroid having been determined, annular region 46 is then located relative to that centroid, as illustrated in FIG. 8. Recall that annular region 46 comprises the safe region from which data may be relied upon and that this annular region is determined relative to the centroid and thus tracks or translates with the position of the centroid. In FIG. 7 the centroid is shifted upwardly and to the left relative to the centroid of calibration FIG. 3. Hence, annular region 46 of FIG. 8 is similarly translated upwardly and to the left.

Next, the feature lighting is turned off and the structured lighting is turned on. The structured lighting source 16 being fixed, relative to optical sensor 22, the cross-hair pattern 18 occurs in generally the same location in FIG. 8 as it did in FIG. 4. The cross-hair patterns are not identical, however, since the workpiece 10 is in a different position in FIG. 8 relative to FIG. 4. Notwithstanding this difference, provided at least one line segment of a positive slope and one line segment of a negative slope fall within the annular region 46, the plane in which hole 12 lies may be determined. Using only data from within annular region 46, the plane surrounding the hole is determined by converting the points defining each line segment into three dimensional real space data using the appropriate rectification tables. Once both positive sloping and negative sloping line segments have been determined in real space coordinates, the geometric intersection of those coordinates can be calculated to yield the geometric representation of the plane surrounding hole 12. Then, by finding the geometric intersection of the plane so determined and line of sight 36, the precise three dimensional real space location of hole 12 may be determined. Having thus determined the three dimensional real space location of the hole being measured, its coordinates can then be compared with the coordinates of the calibration hole developed during the Teach Mode. From these two values the computer 26 is able to determine whether the hole being measured is within tolerance or not.

The present invention finds particular utility in an automated or semi-automated system wherein many identical parts must be tested to determine conformance or non-conformance to a predefined standard. The invention may thus be used to alert the operator or automatic machinery to reject parts which are out of tolerance. The invention may also be used to provide a statistical report giving the number of parts or percentages of parts falling within given tolerance limits. Also, where computer processing speed permits, the statistical data generated by the invention may be used to dynamically fine tune the manufacturing process to achieve even closer tolerances.

While the foregoing represents the presently preferred method for determining the spatial location of a hole in a workpiece, the method is susceptible to variation and change without departing from the scope of the invention as set forth in the appended claims. For example, as previously mentioned, front lighting may be used in place of back lighting in determining the centroid of the hole. Also, if desired, the annular region 46 may be determined from the outer boundaries of the featured lighted centroid. Futher, instead of sequentially illuminating with feature lighting and structured lighting, both sources may be turned on simultaneously.

What is claimed is:

1. A method for measuring the location of a hole in a workpiece comprising the steps of:
projecting feature lighting, characterized by substantially uniform illumination, upon said workpiece;
optically sensing said workpiece under said feature lighting to receive an image comprising comparatively light and dark areas indicative of the centroid of said hole;
projecting structured lighting, characterized by a predetermined geometric pattern of illumination, upon said workpiece;
optically sensing said workpiece under said structured lighting to receive an image comprising a reflected pattern defining a plane in which said hole is disposed; and
determining the geometric intersection of said plane and said centroid to thereby establish the real space location of said hole.

2. The method of claim 1 wherein said real space location is determined by using said centroid to determine a line through the center of said hole and by determining the intersection of said line and said plane.

3. The method of claim 1 wherein said feature lighting comprises back lighting.

4. The method of claim 1 wherein said feature lighting comprises front lighting.

5. The method of claim 1 wherein said structured lighting projects a crosshair pattern.

6. The method of claim 1 further comprising projecting an image of said structured lighting in image space, and determining said plane from said image space projection.

7. A method for measuring the location of a hole in a workpiece comprising the steps of:
projecting feature lighting, characterized by substantially uniform illumination, upon said workpiece;
optically sensing said workpiece under said feature lighting to receive an image comprised comparatively light and dark areas indicative of the centroid of said hole in image space;
from said centroid determining a line in real space which passes through the center of said hole in real space;
projecting structured lighting, characterized by a predetermined geometric image of illumination, upon said workpiece to thereby produce a reflected image in image space;

optically sensing said workpiece under said structured lighting to receive said reflected image being indicative of a plane in which said hole is disposed; and determining the real space location of said hole by determining the geometric intersection of said plane and said line.

8. The method of claim 7 wherein said feature lighting comprises back lighting.

9. The method of claim 7 wherein said feature lighting comprises front lighting.

10. The method of claim 7 wherein said predetermined image is a crosshair image.

11. The method of claim 7 further comprising determining a window in image space based on said centroid, causing at least a first portion of said reflected image to fall within said window and using said first portion to determine said plane.

12. The method of claim 7 wherein said real space location of said hole is determined by determining the intersection of said line and said plane.

13. The method of claim 7 wherein said image space comprises at least one video frame.

14. The method of claim 7 wherein said structured lighting is projected onto a first video frame and wherein said feature lighting is projected onto a second video frame.

15. The method of claim 7 wherein said structured lighting and said feature lighting are projected onto at least one video frame.

16. A method for measuring the location of a hole in a workpiece comprising the steps of:

predetermining a transformation between image space and real space;

projecting feature lighting, characterized by substantially uniform illumination, upon said workpiece;

optically sensing said workpiece under said feature lighting to receive an image comprising comparatively light and dark areas indicative of the centroid of said hole in image space;

applying said predetermined transformation to said centroid to determine a line in real space which passes through the center of said hole in real space;

projecting structured lighting, characterized by a predetermined geometric pattern of illumination, upon said workpiece;

optically sensing said workpiece under said structured lighting to receive an image comprising a reflected image in image space indicative of the plane in which said hole is located;

applying said predetermined transformation to said reflected image to determine the plane in which said hole is located; and determining the real space location of said hole by determining the geometric intersection of said plane and said line.

17. The method of claim 16 wherein said feature lighting comprises back lighting.

18. The method of claim 16 wherein said feature lighting comprises front lighting.

19. The method of claim 16 wherein said predetermined image is a crosshair image.

20. The method of claim 16 wherein said predetermined transformation is applied using a predetermined rectification table.

21. The method of claim 16 wherein said real space location of said hole is determined by determining the intersection of line and said plane.

22. The method of claim 16 further comprising determining a window in image space based on said centroid, causing at least a first portion of said reflected image to fall within said window and using said first portion to determine said plane.

23. The method of claim 16 wherein said image space comprises at least one video frame.

24. The method of claim 16 wherein said structured lighting is projected onto a first video frame and wherein said feature lighting is projected onto a second video frame.

25. The method of claim 16 wherein said structured lighting and said feature lighting are projected onto at least one video frame.

* * * * *

UNITED STATES PATENT AND TRADEMARK OFFICE
CERTIFICATE OF CORRECTION

PATENT NO. : 4,647,208

DATED : March 3, 1987

INVENTOR(S) : Leonard H. Bieman

It is certified that error appears in the above-identified patent and that said Letters Patent is hereby corrected as shown below:

Column 2, line 42, "digitial" should be --digital--.

Column 2, lines 56, "predetermind" should be --predetermined--.

Column 4, line 63, "on" should be --an--.

Column 8, line 20, "Futher" should be --Furthermore--.

Column 8, line 61, "comprised" should be --comprising--.

Column 10, line 28, after "of" insert --said--.

Signed and Sealed this

Eighth Day of September, 1987

*Attest:*

DONALD J. QUIGG

*Attesting Officer*  *Commissioner of Patents and Trademarks*